United States Patent [19]

Crouse

[11] Patent Number: 5,408,067
[45] Date of Patent: Apr. 18, 1995

[54] METHOD AND APPARATUS FOR PROVIDING WELDING CURRENT FROM A BRUSHLESS ALTERNATOR

[75] Inventor: Edward M. Crouse, Euclid, Ohio

[73] Assignee: The Lincoln Electric Company, Cleveland, Ohio

[21] Appl. No.: 161,596

[22] Filed: Dec. 6, 1993

[51] Int. Cl.$^6$ ............................................. B23K 9/095
[52] U.S. Cl. ......................... 219/137 PS; 219/130.21; 219/133
[58] Field of Search ..................... 219/130.21, 130.31, 219/130.32, 130.33, 137 PS, 133

[56] References Cited

U.S. PATENT DOCUMENTS

| | | |
|---|---|---|
| 3,424,970 | 1/1969 | Ross . |
| 3,564,391 | 2/1971 | Dinger . |
| 3,611,097 | 10/1971 | Joslyn . |
| 3,619,761 | 11/1971 | Nagae et al. . |
| 3,673,488 | 6/1972 | Spiller . |
| 3,704,408 | 11/1972 | Schroeder . |
| 3,829,758 | 8/1974 | Studtmann . |
| 3,832,518 | 8/1974 | O'Neal, Jr. . |
| 3,849,719 | 11/1974 | Geiersbach . |
| 3,863,134 | 1/1975 | Pollard . |
| 3,999,034 | 12/1976 | Barhorst . |
| 4,015,188 | 3/1977 | Denis . |
| 4,071,885 | 1/1978 | Bilczo . |
| 4,129,818 | 12/1978 | Goto . |
| 4,180,720 | 12/1979 | Barhorst . |
| 4,264,856 | 4/1981 | Frierdich . |
| 4,314,195 | 2/1982 | Mutter . |
| 4,410,848 | 10/1983 | Frierdich . |
| 4,485,293 | 11/1984 | Tabata et al. ................... 219/130.31 |
| 4,486,801 | 12/1984 | Jackovich et al. . |
| 4,561,059 | 12/1985 | Davis et al. . |
| 4,567,422 | 1/1986 | Sims . |
| 4,616,162 | 10/1986 | Radomski . |
| 4,716,267 | 12/1987 | Reynolds . |
| 4,733,157 | 3/1988 | Malensani . |
| 4,749,935 | 6/1988 | Osborne . |
| 4,769,754 | 9/1988 | Reynolds et al. . |
| 4,999,563 | 3/1991 | Suzuki . |
| 5,006,781 | 4/1991 | Schultz et al. . |
| 5,272,314 | 12/1993 | Moriguchi et al. ............. 219/130.21 |

OTHER PUBLICATIONS

"Thyristor Phase-Controlled Convertors and Cycloconventors", by B. R. Pelley, Wiley-Interscience, New York, N.Y. 1971 (pp. 229–277).
"Electric Machinery Fundamentals", by Stephen J. Chapman, McGraw-Hill 1985 (pp. 555–560).

Primary Examiner—Clifford C. Shaw
Attorney, Agent, or Firm—Vickers, Daniels & Young

[57] ABSTRACT

A welding power supply having a multiphase alternator and a thyristor rectifier using a control circuit to selectively prevent firing of thyristors when a short circuit occurs. Reliable operation of an alternator welding power supply under short circuit conditions is achieved.

8 Claims, 5 Drawing Sheets

METHOD AND APPARATUS FOR PROVIDING WELDING CURRENT FROM A BRUSHLESS ALTERNATOR

BACKGROUND OF THE INVENTION

This invention relates to engine-driven welding power supplies and more particularly to a D.C. welding power supply using an engine-driven, multiphase alternator providing current to a multiphase thyristor rectifier circuit. The invention more particularly provides a method of supplying short circuit condition current from a multiphase alternator to a welding apparatus.

Self-contained gasoline or diesel fuel welding power supplies are popular products. Such products generally comprise a gasoline or diesel engine which drives an electrical generator having an electrical output which is used to create an arc and weld metal. Three-phase, alternating current generators are often used. One type of three-phase, alternating current generator is known as a three-phase, brushless induction alternator. Such alternators have advantages in that they are generally less expensive than other types to manufacture, are rugged and generally dependable. One shortcoming of brushless alternators is their behavior when their output is short circuited. Either no current flows or current flow is very erratic. In many applications, short circuit conditions are never encountered and the problem just described is not significant. However, in welding applications, short circuit conditions, or conditions very closely resembling a short circuit condition, are often encountered. A lack of output or erratic behavior during short circuit conditions are therefore significant problems.

SUMMARY OF THE INVENTION

The present invention provides a method of controlling the output of a three-phase, rectified, brushless alternator which provides a controllable current even when the output is short circuited or conditions approach those of a short circuit. In accordance with the present invention, a multiphase induction alternator provides three-phase current to a three-phase thyristor rectifier which in turn provides a DC output current for welding. Means sensing the magnitude of welding output detect the presence of short circuit conditions and prevent selected ones of the thyristors in the rectifier circuit from firing, while firing at least one remaining thyristor, to provide a controlled output during short circuit conditions.

Still further in accordance with the invention, sensing means are provided to sense winding output voltage and to detect short circuit conditions by detecting a drop in average voltage to a preselected value.

Yet further in accordance with the invention, a microprocessor control is used to provide arc current magnitude control in accordance with user-selected parameters and also to selectively fire or prevent firing of thyristors in response to short circuit conditions.

Still further in accordance with the invention, a method of providing an electrical current to an arc welder includes providing a multiphase alternator having a multiphase output; providing a multiphase rectifier comprised of several thyristors receiving the output from the alternator and having a direct current output; sensing the existence of short circuit conditions; and, when short circuit conditions are detected, preventing selected ones of the thyristors from conducting at intervals during the duration of the short circuit condition.

It is the primary object of the present invention to provide a multiphase, brushless alternator welder having a good short circuit response.

It is another object of the present invention to provide a method of controlling a rectifier for a brushless alternator welder in which short circuit current can be reasonably controlled.

It is still another object of the present invention to provide a method of controlling a rectifier for a brushless, multiphase alternator in which output current can be maintained during short circuit conditions.

It is still another object of the present invention to provide a controller for a rectified brushless, multiphase alternator welding power supply which is reliable in operation, capable of handling short circuit conditions and inexpensive to manufacture.

These and other objects and advantages of the invention will become apparent from the following description, the accompanying drawings and the appended claims.

Figure 4:
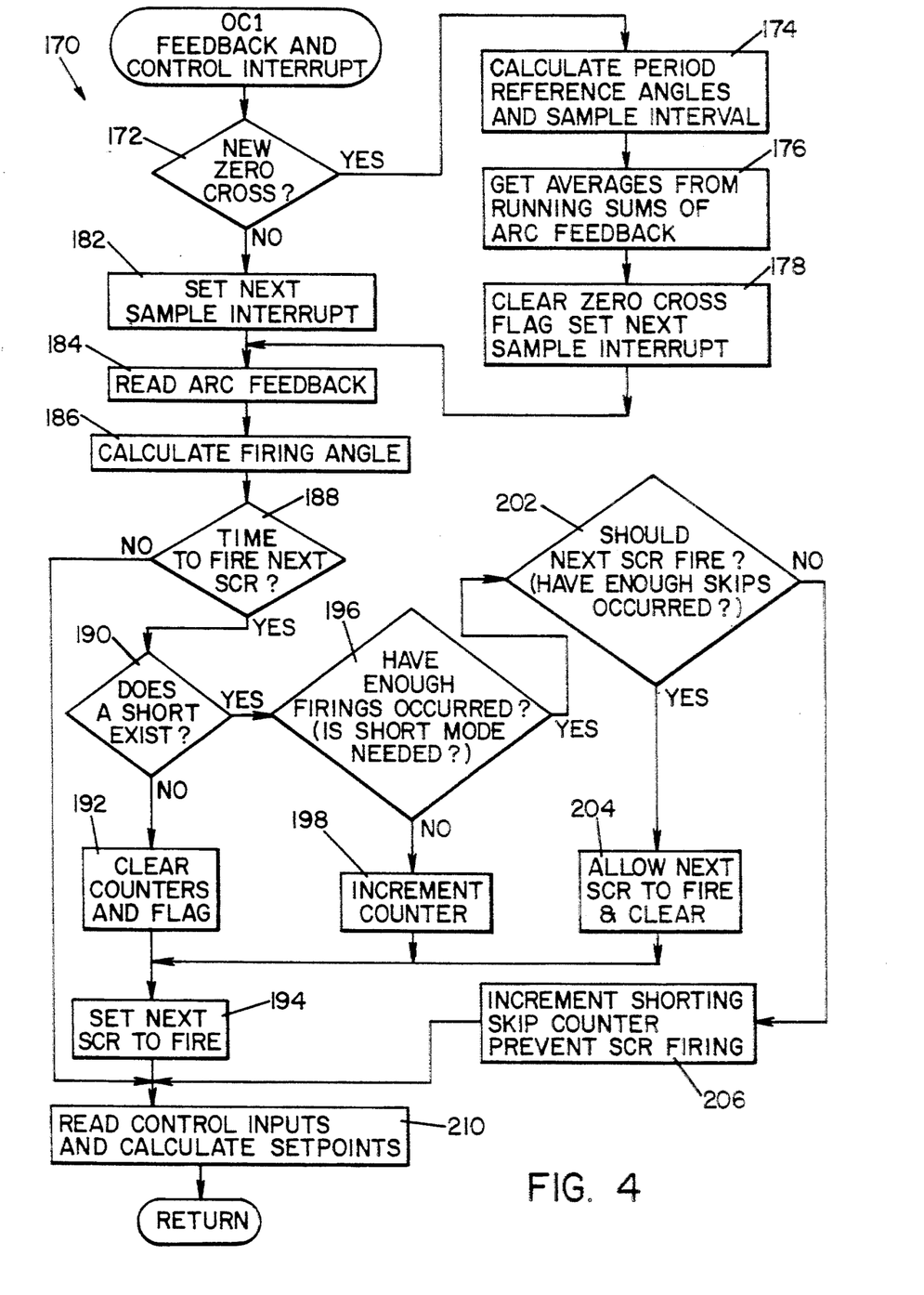
FIG. 4 is a flow chart for the feedback and control interrupt sequence which performs the primary control functions in the circuit of FIG. 1.

An Appendix program list describing in detail the implementation of a portion of the method of FIG. 4 was filed with this application.

Figure 1:
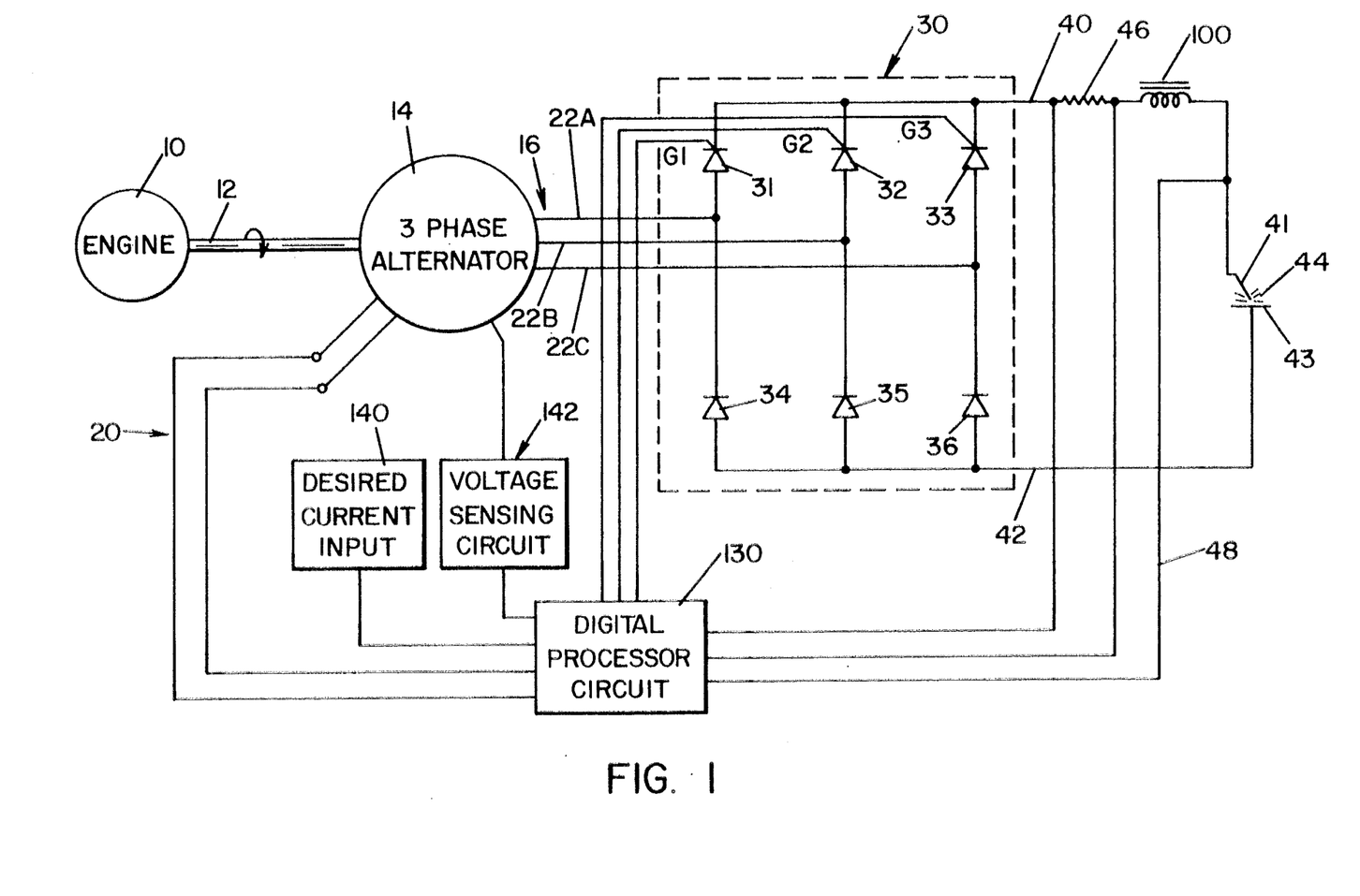
FIG. 1 is a schematic diagram, mostly in block form, of an engine-powered welder including an alternator, rectifier and control circuitry.
Figure 2:
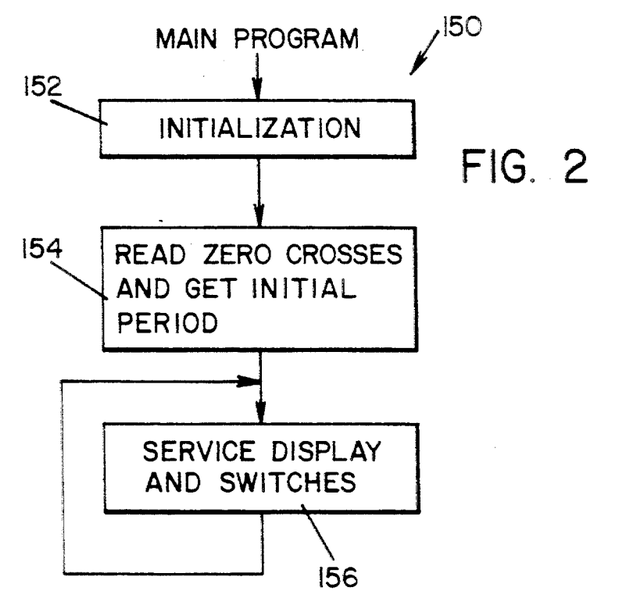
FIG. 2 is a flow chart describing a portion of the control sequence and mechanism used in the circuit of FIG. 1.
Figure 5:
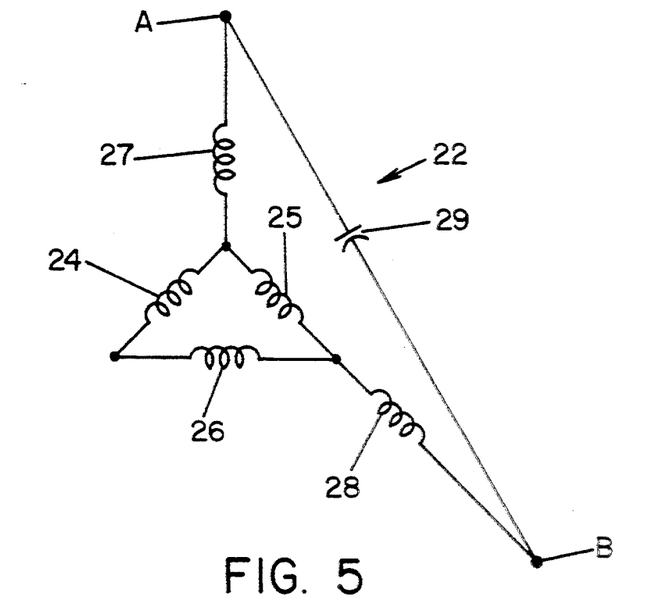
FIG. 5 shows, schematically, the windings of the alternator seen in FIG. 1.

Referring now to the drawings wherein the showings are made for the purpose of illustrating a preferred embodiment of the invention only and not for the purposes of limiting same, FIG. 1 shows an arc welding power supply in which an engine 10 is physically connected through a shaft 12 to an alternator 14. The alternator 14 is a three-phase, induction-type, brushless alternator having a three-phase welding power output 16 and a synchronizing output 20. Conventionally, such an alternator may also have an auxiliary output providing 120 volt or 240 volt current. As seen in FIG. 5, the alternator has 3 delta-connected welding current windings 24, 25, 26 and two excitation windings 27, 28. A capacitor 29 provides reactive power as required. Two additional capacitors (not shown) normally interconnect the three phases in a conventional manner.

Figure 6:
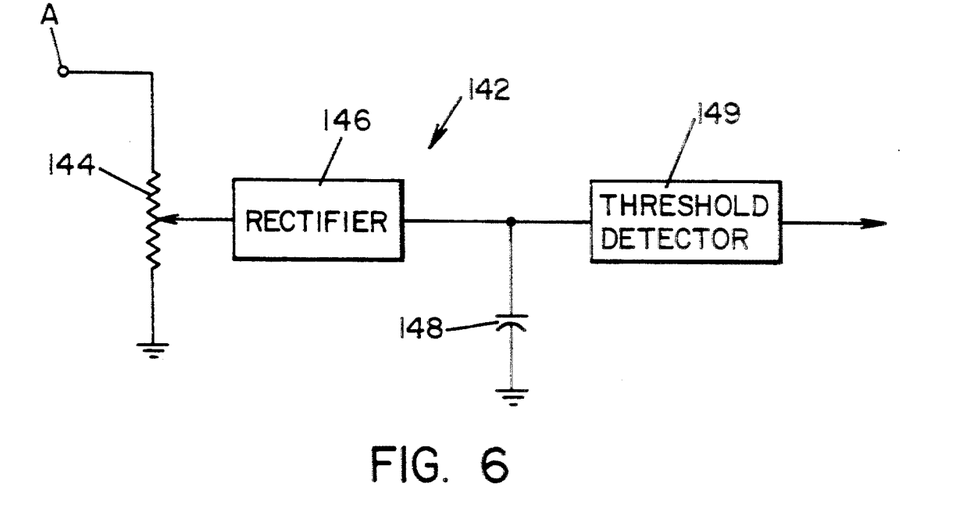
FIG. 6 shows, schematically, the voltage sensing circuit used in the circuit of FIG. 1.

FIG. 6 shows the voltage sensing circuit 142 of FIG. 1 in more detail. A potentiometer 144 divides the high voltage at output A and applies the divided voltage to a rectifier 146. The output of the rectifier 146 is filtered by a capacitor 148 and applied to a threshold detector 149. The threshold detector 149 provides an output indicative of the output voltage at the output terminal A. A very low output held for a selected period is indicative of a short circuit condition. The filtering applied in the sensing circuit 142 prevents short circuits of extremely small duration, such as those encountered in drop transfer welding, from being interpreted as a damaging short circuit. Filtering and selection of appropriate constants, such as the voltage indicative of a short circuit requiring remedial action, allow momentary shorts which will not adversely affect the alternator.

Figure 8:
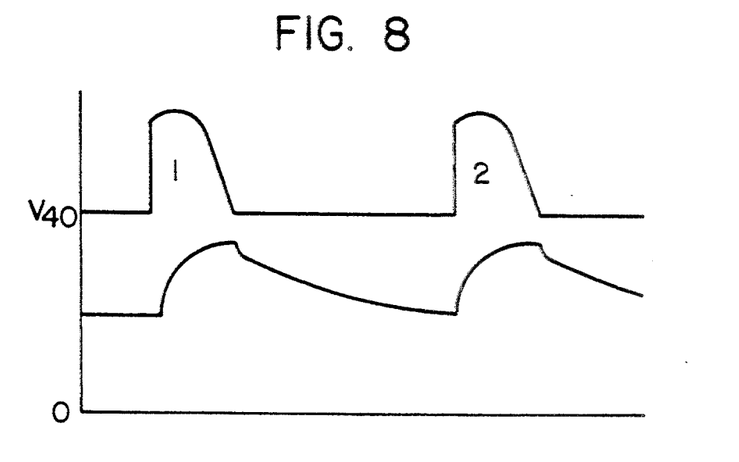
FIG. 8 shows output current waveforms obtained in the circuit of FIG. 1.

The three-phase welding power output is carried on three alternator output lines 22A, 22B, 22C which carry the three phases of output in a conventional manner. A rectifier bridge 30 receives the three-phase output on lines 22A, 22B, 22C. The rectifier bridge 30 is comprised of three semiconductor-controlled rectifiers ("SCR's") 31, 32, 33 and three diodes 34, 35 and 36. The SCR's and diodes are connected in a conventional bridge arrangement. Each of the SCR's and diodes receive current from one of the three-phase power lines and deliver current to the DC welding power output line 40 and the DC welding ground line 42. Filtering elements, such as inductors, chokes and/or capacitors, are sometimes added in a conventional manner. An output choke 100 is shown. The effect of the choke 100 is shown in FIG. 8. The upper curve shows output current without a choke. The lower curve shows output current with a choke 100. The SCR-diode bridge described is well known in the industry. Alternatives using six SCR's are also well known and available.

Conventionally, capacitors (not shown) are connected between the alternator output lines 22A, 22B, 22C or extensions of these windings to provide reactive power as required.

The DC welding power output on line 40 is connected to a welding electrode 41 and the DC ground 42 is connected to the work piece 43. The two are joined electrically by the arc 44, as is conventional. Additionally, polarity of the electrode and ground can be changed as required. Arc current is sensed at a current sensing shunt 46 and current magnitude information is conditioned and conveyed to a digital processor circuit 130. An arc voltage sensing line 48 may be used to provide information on arc voltage to the digital processor circuit 130.

A desired current input 140 is provided on the welding power supply. The desired current input 140 can take the form of a dial, push button or any other conventional means of introducing digital information into electrical machinery. It allows the operator to set the desired welding current and conveys this information to the digital processor circuit 130, which actually controls the current and achieves the desired end. Other welding parameters can also be set at the input 140. The digital processor circuit controls the firing of the SCR's 31, 32, 33 by applying gating signals to the gate terminals of the SCR's G1, G2, G3. As is conventional, the rectifier bridge 30 receives three-phase power from the alternator 14. The output current of the rectifier bridge 30 is controlled by turning the SCR's 31, 32, 33 on for selected periods of time by means of signals on the gates G1, G2, G3. The digital processor circuit receives information from the current sensing shunt 46, the voltage line 48 and the sync line 20. The processor determines how much to advance or retard the gating signals by comparing the actual current to the desired current set through the desired current input 140. The gating signals are synchronized by means of the synchronizing information on the sync line 20. When more current is needed, the SCR's are turned on earlier in the positive going half cycle and more current is delivered to the arc 44.

When short circuit conditions occur at the arc 44, the alternator sees virtually no impedance at its output lines 22A, 22B, 22C. The capacitors and/or inductors which supply reactive power and magnetization current are short circuited. This can cause the magnetic field producing the current in the output lines to collapse, resulting in the complete cessation of output current and/or erratic behavior. This problem is addressed in the present invention by assuring that the alternator is presented with some impedance during each cycle thereby maintaining the magnetic field within the alternator in a reliable manner. When a short circuit condition is sensed, gating signals are not provided to one or more of the SCR's 31, 32, 33. When an SCR is not provided with a gating signal, it does not turn on and does not conduct current. This provides an impedance to the alternator and prevents the collapse of the magnetic field. In the preferred embodiment, this is done through software control. However, the same circuit condition can be achieved through digital or analog electronic controls.

The means by which the gating signals are controlled to ensure impedance is shown in FIGS. 2–7. The main program 150 (FIG. 2) contains an initialization step 152, a set initial periods step 154 and a service display and switches step 156. In essence, the main program does a machine self check when the machine is turned on, calculates the period of oscillation of the three-phase power as seen in the three-phase power output 16 and reads the user inputs set at the front panel 140. The remaining control functions are driven by interrupts. It must be remembered that microprocessor controls operate very quickly. Current microprocessors operate at clock frequencies varying from 2 megahertz up to about 100 megahertz. The frequency of the three-phase alternator, on the other hand, is about 50 or 60 hertz. Thus, the microprocessor is performing thousands to millions of steps during each individual cycle of the three-phase alternator.

Figure 3:
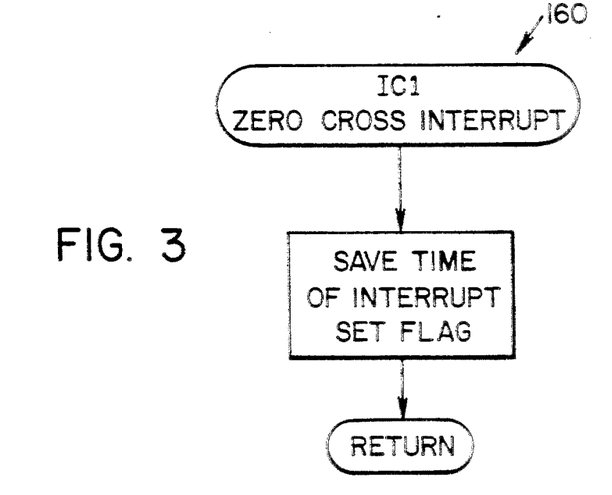
FIG. 3 is a flow chart for the zero cross interrupt which obtains timing information in the circuit of FIG. 1.

The primary timing reference for control is the sync signal on the sync line 20. The sync signal is applied to a zero crossing detector within the digital processor circuit 130. When a zero crossing is detected, a signal is passed to the microprocessor which sets a zero cross flag. This is seen in the zero cross interrupt sequence 160 (FIG. 3). The function of this sequence is to note the time of a zero crossing by the sync signal for use in determining the firing angles of the SCR's 31, 32, 33. As the sync signal line carries a voltage signal indicative of alternator rotor field position, a zero crossing of this signal has a fixed time relationship to the zero crossing of the power signals for all three phases 22A, 22B, 22C of the output power. Moreover, as the rotational speed of the alternator rotor is fairly constant when compared to a digital processing circuit 130 clock speed, and the direction of rotation is known, a single sync signal on the sync line 20 is adequate for use in creating gating signals for all three SCR's 31, 32, 33.

The feedback and control interrupt sequence 170 (FIG. 4) performs the primary timing and firing operations for the SCR's. The sequence is called at regular and frequent intervals. As described earlier, the alternator output on lines 22A, 22B, 22C has a frequency of about 50 or 60 hertz. This provides a period of approximately 17 milliseconds. Feedback and control interrupt sequence 170 is called sufficiently frequently to provide an adequate sampling rate for signals of this frequency and period. After being called, the feedback and control interrupt sequence 170 first checks to see if the new zero cross flag has been set by the zero cross interrupt sequence 160. If the flag is set, the sequence branches at the new zero cross branch step 172. The digital processor circuit 130 then calculates the period between the newly set zero cross time and the previous zero cross time to arrive at a new period in a calculation step 174. Information previously read from feedback circuitry is processed to obtain welding parameters, reference angles, and the next sample interval for use in subsequent calculations. A get averages step 176 follows. Averages of monitored parameters are obtained and calculated. The processor then clears the zero crossing flag set in the zero crossing interrupt sequence 160 in a clear flag step 178. The time for the next sample interrupt sequence 170 to start is also set in the clear flag step 178. The main sequence of feedback and control interrupt sequence 170 is then rejoined at the read arc feedback step 184.

If the new zero cross branch step 172 determines that the zero cross flag has not been set, the branch just described is not taken and the feedback and control interrupt 170 continues with the main sequence starting with setting the next sample interrupt in the set next interrupt step 182. Once the interrupt is set to initiate the next feedback and control interrupt sequence 170, the sequence continues by reading current arc feedback in the read arc feedback step 184. Alternator output voltage is sensed by the voltage sensing circuit 142 and applied to the digital processor circuit 130. Arc current is sensed through the current sensing shunt 46 and is likewise digitized in the digital processor circuit 130. These values are read in the read feedback step 184 and stored in memory for use in computing averages in the get averages step 176 and otherwise as required.

The averages calculated in step 176 and the feedback information obtained in step 184 are used to calculate firing angles for the SCR's in a calculation step 186. As is generally known, SCR's conduct only when they are forward biased and only after receipt of a gating pulse at their gate terminal. The amount of current passed by an SCR is therefore dependent upon the point in time in the forward biased half cycle of the SCR when a gating pulse is received. The point at which a gating pulse is applied to the gate terminal of an SCR is normally referred to in angular measure. In the present application, firing angles are calculated for each of the three SCR's. The delay time from a zero crossing of the sync signal on line 20 for each SCR is then calculated and stored. The digital processor circuit 130 then has information on when to fire each SCR. In a timing step 188, the feedback and control interrupt sequence compares the current time from the clock to the set times for firing the individual SCR's and determines if it is time to fire an SCR or not. If it is not time to fire an SCR, the sequence skips to a read control inputs and calculate set points step 210. If it is time to fire an SCR, the short circuit decision step 190 is executed. This step initiates a sequence which determines if SCR firings should be skipped in order to prevent the collapse of the magnetic field due to a short circuit condition. The digital processor 130 compares a variable ARCV, the digital representation of the voltage sensed in the voltage sensing circuit 142, to a constant SHORT_VAL, a voltage value indicating a short circuit. This comparison determines whether a short circuit condition exists or not. If no short circuit condition exists, the values for various counts used in the short circuit sequence are reset to zero in a clear counters and flags step 192 and the sequence proceeds to set the next SCR to fire in a firing step 194. If the decision step 190 determines that a short circuit condition does exist, a count comparison decision step 196 is executed. The object to be achieved by the count comparison decision step is the firing of a fixed number of SCR's (such as 1) followed by a fixed number of non-firings (such as 3) after the detection of a short circuit.

A count is kept of the number of consecutive SCR firings since a short circuit condition was first detected under the name SHORT_CNT. The count comparison step 196 determines if this has been achieved by comparing SHORT_CNT to SHORT_MAX. SHORT_MAX is the number of consecutive SCR firings desired in a short circuit condition. If the two are not equal, a "no" decision is reached and the count SHORT CNT is incremented in an increment counter step 198. The sequence returns to the SCR firing step 194. If the SHORT_CNT count is equal to SHORT_MAX, the decision "yes" is reached in step 196 and the sequence proceeds to the short factor comparison step 202.

Figure 7:
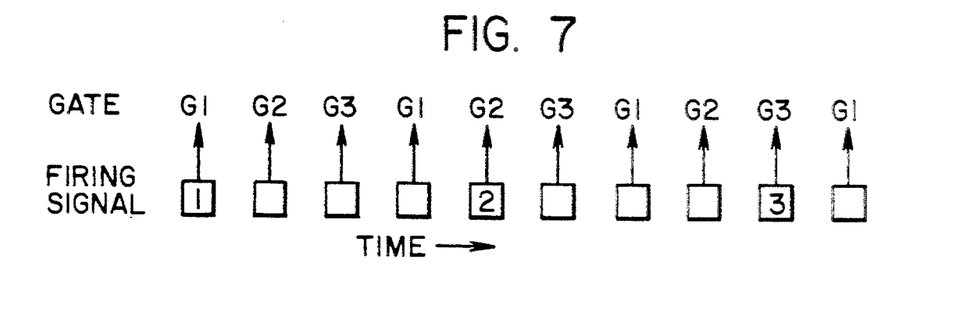
FIG. 7 shows a preferred short circuit firing sequence achieved by the circuit of FIG. 1.

A count is kept of the number of consecutive SCR non-firings under the name SHORT_CNT1. SHORT_CNT1 is compared to a constant identified as SHORT_FACTOR in comparison step 202. SHORT_FACTOR is the number of consecutive skipped firings desired during short circuit conditions. If these two are equal, it means a sufficient number of skipped firings of SCR's has been achieved and a clear step 204 is executed. The clear step 204 resets SHORT_FLG and SHORT_CNT1 to zero and returns to SCR firing step 194. If however, SHORT_CNT1 is not determined to be equal to SHORT_FACTOR in step 202, the decision returned is "no" and short count increment step 206 is executed. This causes the digital processor circuit 130 to refrain from sending a gating pulse to the next scheduled SCR for firing achieving a skip in the firing cycle. The branch of the feedback and control sequence 170 then returns to the main sequence at the read control inputs step 210. By choosing appropriate values for constants and incrementing the above described counts, one can easily have any sequence of skips of the firing of SCR's in response to a short circuit. A preferred sequence of fire 1, skip 3 is shown in FIG. 7. This sequence spreads the short circuit current load over all the SCR's. Any other sequence appropriate for maintaining a magnetic field in the alternator is easily programmed.

Figure 9:
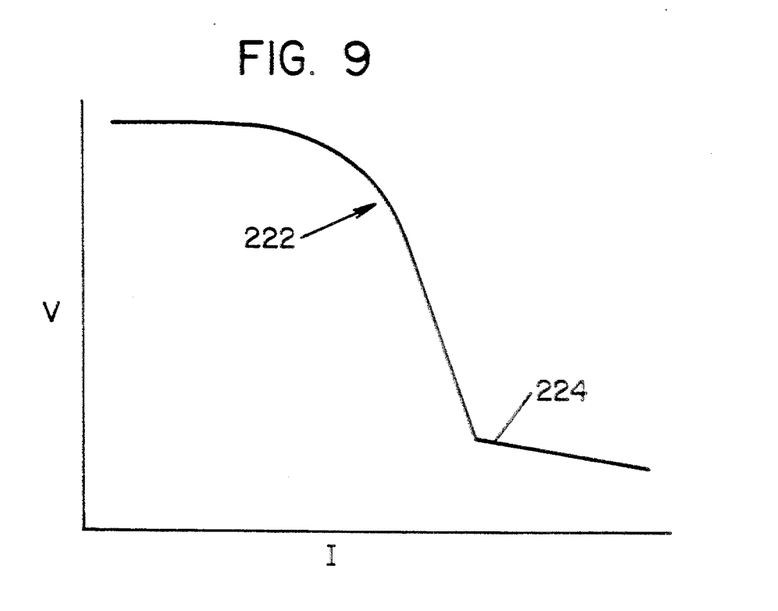
FIG. 9 shows the output volt-ampere curve obtained with the circuit of FIG. 1.

The sequence of fire 1, skip 3 results in a large impedance being provided to the alternator output. Output voltage quickly builds and the voltage sensing circuit 142 will indicate no short. Normal firing will resume. If a short circuit condition persists, the process described above will be immediately repeated. The control sequence just described results in an arc volt-ampere curve, as shown in FIG. 9. The drooping volt-ampere curve segment 222 is the result of non-short circuit control. The short circuit firing skip sequence produces the generally linear low voltage segment 224.

The read control inputs and calculate set points step 210 is executed regardless of the outcomes of decision steps 188, 190, 196 and 202. Front panel settings are read by the microprocessor and set points calculated for the next interrupt sequence. The feedback and control interrupt sequence 170 then terminates and returns control of the digital processor circuit 130 back to the main program 150 until an interrupt again initiates either the zero cross interrupt sequence 160 or the feedback control interrupt sequence 170. The sequence of instructions described above with reference to steps 190–206 is fully set forth in the appendix, a program listing performing this control function.

The above described procedures and arrangements provide a mechanism for maintaining magnetization of an alternator during short circuit conditions, which are often encountered in welding. The sequences provide for reliable, productive operation of a welding power supply using a brushless alternator as a power source. While the mechanism and method described above is implemented in a microprocessor, the same mechanism could be implemented in discrete logic or analog circuitry. Obviously, modifications and alterations to the invention will occur to others upon the reading and understanding of this specification. It is intended to include all such modifications and alterations insofar as they come within the scope of the appended claims.

I claim:

1. A welding power supply comprising:
   an alternator having a multiphase output;
   a rectifier bridge comprising a multiplicity of thyristors receiving said alternator multiphase output and having a direct current output suitable for use in direct current arc welding;
   means sensing said direct current output;
   selector means allowing an operator to select a desired value for said direct current output;
   control means adapted to control the operation of said thyristors and therefore said direct current output responsive to said selector means; and,
   means responsive to a short circuit condition for said multiphase output, said responsive means causing at least one of said thyristors to remain non-conductive for at least one firing cycle during said short circuit condition and causing at least one of said thyristors to conduct for at least a portion of at least one firing cycle during said short circuit condition.

2. The welding power supply of claim 1 wherein said means sensing said direct current output comprises means sensing alternator output voltage and said responsive means comprises means comparing said sensed alternator output voltage to a selected value indicative of a short circuit condition.

3. A welding power supply comprising:
   an alternator having a multiphase output;
   a rectifier bridge comprising a multiplicity of thyristors receiving said alternator multiphase output and having a direct current output suitable for use in direct current arc welding;
   means sensing said direct current output;
   selector means allowing an operator to select a desired value for said direct current output;
   control means adapted to control the operation of said thyristors and therefore said direct current output responsive to said selector means; and,
   means responsive to a short circuit condition for said multiphase output, said responsive means causing at least one of said thyristors to remain non-conductive for at least one firing cycle during said short circuit condition wherein said responsive means includes a first means counting the number of thyristor firings during a short circuit and causing at least one firing cycle only after said first counting means reaches a selected value.

4. The welding power supply of claim 3 wherein said responsive means includes a second means counting the number of successive times any thyristor has remained non-conductive during a short circuit and causing at least one of said thyristors to remain non-conductive for a pre-determined number of cycles when said second counting means remains below a selected value.

5. A method of providing electrical current to an electrical arc welder comprising:
   providing a multiphase induction alternator having a multiphase output;
   providing a multiphase rectifier receiving said multiphase output from said alternator said rectifier having a rectified output and a multiplicity of thyristors;
   each said thyristor having a control gate and being adapted to conduct current in response to signals on said control gate;
   providing means sensing the magnitude of said alternator output;
   preventing at least one thyristor from conducting and firing at least one remaining thyristor when said sensing means detects a magnitude of said alternator output indicative of a short circuit condition.

6. A method of providing electrical current to an electrical arc welder comprising:
   providing a multiphase induction alternator having a multiphase output;
   providing a multiphase rectifier receiving said multiphase output from said alternator said rectifier having a rectified output and a multiplicity of thyristors;
   each said thyristor having a control gate and being adapted to conduct current in response to signals on said control gate;
   providing means sensing the magnitude of said alternator output;
   preventing selected ones of said thyristors from conducting when said sensing means detects a magnitude of said alternator output indicative of a short circuit condition determining if a short circuit exists; if no short circuit exists allowing the next thyristor to fire, if a short circuit exists, keeping count of the number of thyristor firings since the start of the short circuit condition and determining if the number of such firings equals a selected firing count; if said number of firings does not equal said selected firing count, allowing the next thyristor to fire, if said number of firings does equal said selected firing count, keeping count of the number of thyristor firings sequentially prevented and determining if the number of such preventions equals a selected skip count; if said number of preventions equals said skip count, allowing the next thyristor to fire, if said number of preventions does not equal said skip count, preventing the firing of the next thyristor.

7. The method of claim 5, wherein said rectifier comprises three semiconductor-controlled rectifiers and three diodes.

8. A method of providing welding current from a welding power supply having an alternator and a rectifier bridge comprised of a multiplicity of thyristors comprising the steps of:

sensing the output voltage of said alternator;

comparing said sensed output voltage to a voltage reference to determine if a short circuit exists;

if a short circuit exists, skipping the firing of at least one thyristor and firing at least one thyristor in said bridge.

* * * * *